(12) United States Patent
Takeuchi

(10) Patent No.: US 6,966,199 B2
(45) Date of Patent: Nov. 22, 2005

(54) EJECTOR WITH THROTTLE CONTROLLABLE NOZZLE AND EJECTOR CYCLE USING THE SAME

(75) Inventor: Hirotsugu Takeuchi, Nagoya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/614,361

(22) Filed: Jul. 7, 2003

(65) Prior Publication Data

US 2004/0007013 A1    Jan. 15, 2004

(30) Foreign Application Priority Data

Jul. 9, 2002 (JP) ............................. 2002-199993

(51) Int. Cl.[7] .................................................. F25B 1/00
(52) U.S. Cl. .............................. 62/500; 62/503; 62/528
(58) Field of Search ......................... 62/116, 191, 500, 62/503, 512, 527, 528; 137/111, 114

(56) References Cited

U.S. PATENT DOCUMENTS

| | | | |
|---|---|---|---|
| 3,496,735 A | | 2/1970 | Haisma |
| 3,670,519 A | * | 6/1972 | Newton ........................ 62/116 |
| 3,701,264 A | * | 10/1972 | Newton ........................ 62/191 |
| 4,129,012 A | | 12/1978 | Mairs |
| 4,342,200 A | * | 8/1982 | Lowi, Jr. ...................... 62/191 |
| 4,506,518 A | * | 3/1985 | Yoshikawa et al. ........... 62/180 |
| 4,707,278 A | | 11/1987 | Breyer |
| 5,343,711 A | * | 9/1994 | Kornhauser et al. .......... 62/116 |
| 6,044,655 A | * | 4/2000 | Ozaki et al. .................. 62/205 |
| 6,138,456 A | * | 10/2000 | Garris .......................... 60/649 |
| 6,220,571 B1 | * | 4/2001 | Kim et al. .................... 251/284 |
| 6,438,993 B2 | * | 8/2002 | Takeuchi et al. .............. 62/500 |
| 6,477,857 B2 | * | 11/2002 | Takeuchi et al. .............. 62/500 |
| 6,550,265 B2 | * | 4/2003 | Takeuchi et al. ........... 62/324.2 |
| 6,584,794 B2 | * | 7/2003 | Takeuchi et al. .............. 62/278 |
| 6,701,715 B2 | * | 3/2004 | Anderson et al. ............. 60/782 |
| 6,706,438 B2 | * | 3/2004 | Sahoda et al. ................ 429/34 |
| 6,758,295 B2 | * | 7/2004 | Fleming ...................... 180/165 |
| 6,858,340 B2 | * | 2/2005 | Sugawara et al. ............ 429/34 |

FOREIGN PATENT DOCUMENTS

| | | |
|---|---|---|
| EP | 0 020 146 | 12/1980 |
| EP | 0 487 002 | 5/1992 |

(Continued)

OTHER PUBLICATIONS

Bul. 32/30.8.90 for Gas medium Eject active nozzle axis displace regulate neddle.*

(Continued)

*Primary Examiner*—Mohammad M. Ali
(74) *Attorney, Agent, or Firm*—Harness, Dickey & Pierce, PLC

(57) ABSTRACT

An ejector includes a nozzle having therein a throat portion, and a needle valve that extends at least from the throat portion to the outlet of the nozzle. The needle valve is displaced in an axial direction of the nozzle to adjust an opening degree of the throat portion and an opening degree of an outlet of the nozzle. Therefore, even when a flow amount of refrigerant flowing into the nozzle is changed, it can prevent a vertical shock wave from being generated by suitably adjusting both the opening degrees of the throat portion and the opening degree of the outlet of the nozzle. Accordingly, nozzle efficiency can be improved regardless of a change of the flow amount of the refrigerant.

4 Claims, 4 Drawing Sheets

| | FOREIGN PATENT DOCUMENTS | |
|---|---|---|
| EP | 1 134 517 | 9/2001 |
| EP | 1 160 522 | 12/2001 |
| JP | 62-206348 | 9/1987 |
| JP | 405312421 A * | 11/1993 |
| JP | 6-002964 | 1/1994 |
| JP | 11-037306 | 2/1999 |
| JP | 2000-055211 | 2/2000 |
| JP | 02002022295 A * | 1/2002 |
| JP | 2002-227799 A * | 8/2002 |

OTHER PUBLICATIONS

Patent Abstracts of Japan, Publication No. 61200400 dated Apr. 9, 1986.
Patent Abstracts of Japan, Publication No. 04276200 dated Jan. 10, 1992.
Patent Abstracts of Japan, Publication No. 01196000 dated Jul. 8, 1989.
Jul. 16, 2004 People's Republic of China Office Action.

* cited by examiner

EJECTOR WITH THROTTLE CONTROLLABLE NOZZLE AND EJECTOR CYCLE USING THE SAME

CROSS-REFERENCE TO RELATED APPLICATION

This application is related to and claims priority from Japanese Patent Application No. 2002-199993 filed on Jul. 9, 2002, the contents of which are hereby incorporated by reference.

BACKGROUND OF THE INVENTION

1. Field of the Invention

The present invention relates to an ejector with a throttle controllable nozzle in which two opening degrees of a throat portion and an outlet of the nozzle can be controlled, and an ejector cycle using the ejector. The ejector has a fluid pumping function for circulating a fluid by entrainment of a drive fluid injected at a high speed.

2. Description of Related Art

In an ejector cycle, pressure of refrigerant to be sucked into a compressor is increased by converting expansion energy to pressure energy in an ejector, thereby reducing motive power consumed by the compressor. Further, refrigerant is circulated into an evaporator of the ejector cycle by using a pumping function of the ejector. However, when energy converting efficiency of the ejector, that is, ejector efficiency is reduced, the pressure of refrigerant to be sucked to the compressor cannot be sufficiently increased by the ejector. In this case, the motive power consumed by the compressor cannot be satisfactorily reduced. On the other hand, a throttle degree (passage opening degree) of the nozzle is fixed in the ejector. Therefore, when an amount of refrigerant flowing into the nozzle changes, a nozzle efficiency and the ejector efficiency are changed in accordance with the change of the refrigerant flowing amount. Here, the nozzle efficiency is an energy converting efficiency of the nozzle when the pressure energy is converted to the speed energy in the nozzle.

Further, according to experiments by the inventor of the present invention, if only an opening degree of a throat portion of the nozzle is simply changed, vertical shock wave is generated between a throat portion and an outlet of the nozzle, and the pressure of refrigerant is rapidly changed therebetween. Accordingly, at the outlet of the nozzle, a fluid (refrigerant) is in a subsonic state, and is super-expended. As a result, the refrigerant is not decompressed in iso-entropy in the nozzle, and the nozzle efficiency may be greatly reduced.

SUMMARY OF THE INVENTION

In view of the foregoing problems, it is an object of the present invention to provide an ejector which can sufficiently increase nozzle efficiency regardless of a flow amount of refrigerant.

It is another object of the present invention to provide an ejector cycle using the ejector.

According to the present invention, an ejector includes a nozzle for defining therein a passage through which a drive fluid flows, and a pressure-increasing portion in which a fluid is sucked by entrainment of a jet flow of the drive fluid injected from the nozzle and is mixed with the drive fluid injected from the nozzle. In the ejector, the nozzle includes a throat portion having a cross-sectional area that is smallest in the passage of the nozzle, and an adjustment unit is disposed to adjust an opening degree of the throat portion and an opening degree of an outlet of the nozzle. Because both the opening degrees of the throat portion and the outlet of the nozzle are controlled by the adjustment unit, it can effectively restrict vertical shock wave from being generated even when the flow amount of the drive fluid flowing into the nozzle is changed. Therefore, it can prevent a super-expansion state, where the flow speed of the drive fluid at the outlet of the nozzle becomes subsonic, from being caused. Accordingly, nozzle efficiency can be sufficiently increased regardless of the flow amount of the drive fluid flowing into the nozzle.

Preferably, the adjustment unit includes a needle valve that extends at least from the throat portion to the outlet of the nozzle. Therefore, both the opening degrees of the throat portion and the outlet of the nozzle can be readily controlled simultaneously. Generally, the needle valve is disposed to be moved in an axial direction of the nozzle.

The ejector of the present invention can be suitably used for an ejector cycle including a compressor for compressing and discharging a refrigerant, a first heat exchanger disposed for cooling the refrigerant discharged from the compressor, a gas-liquid separator for separating refrigerant from the ejector into gas refrigerant and liquid refrigerant, and a second heat exchanger disposed for evaporating liquid refrigerant from the gas-liquid separator. In this case, the refrigerant from the first heat exchanger is decompressed in the nozzle, and the refrigerant evaporated in the evaporator is sucked into a pressure-increasing portion of the ejector. The refrigerant from the nozzle and the refrigerant from the evaporator are mixed in the pressure-increasing portion while the pressure of refrigerant is increased in the pressure-increasing portion. Accordingly, the ejector cycle can be operated while the nozzle efficiency can be improved.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

Figure 1:
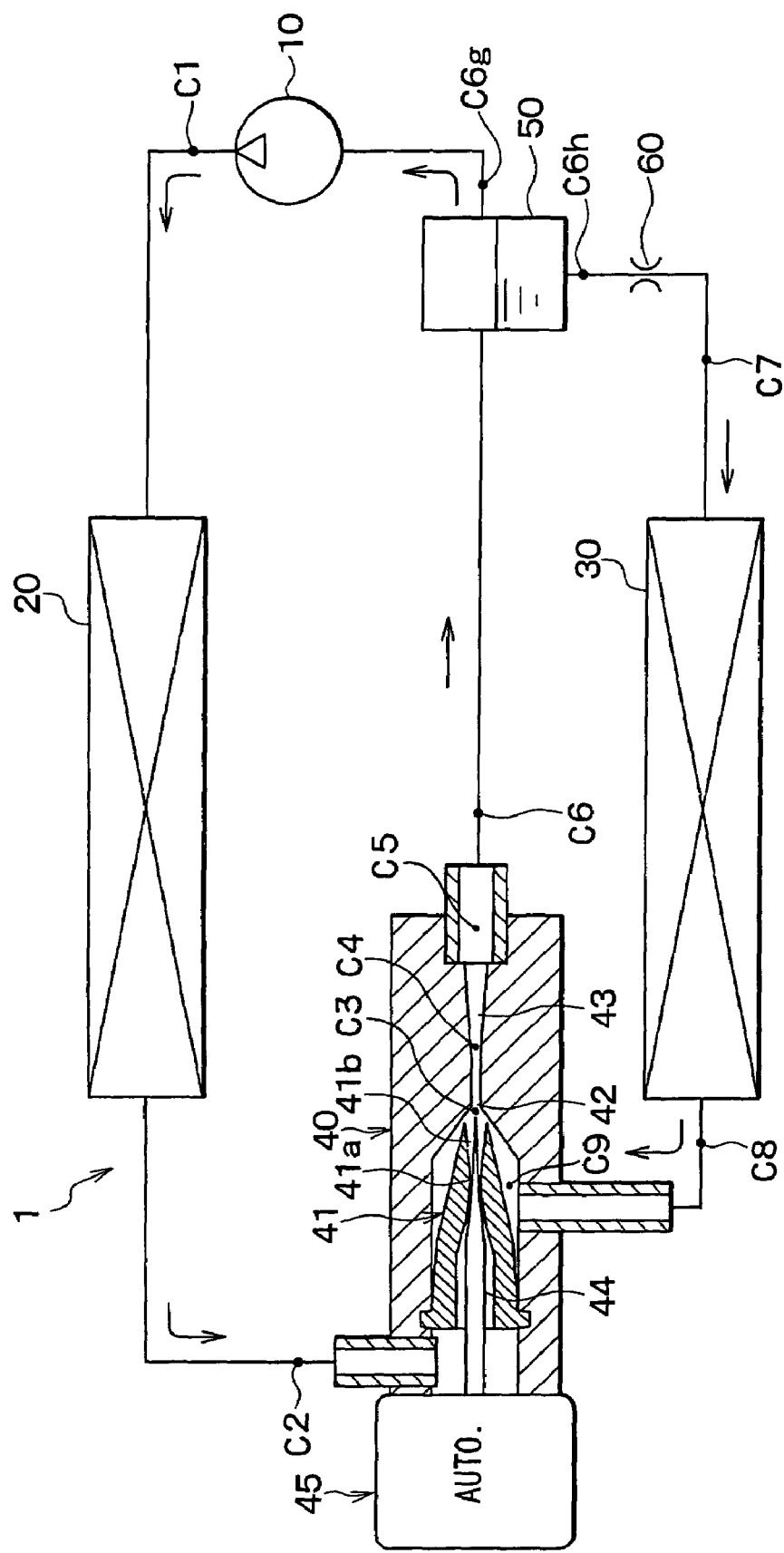
FIG. 1 is a schematic diagram showing an ejector cycle according to a preferred embodiment of the present invention.

A preferred embodiment of the present invention will be described hereinafter with reference to the appended drawings.

In the embodiment, an ejector of an ejector cycle is typically used for an air conditioner. In the ejector cycle shown in FIG. 1, fluorocarbon (fleon, 134a) or carbon dioxide or the like can be used as a refrigerant. In the ejector cycle, a compressor 10 sucks and compresses refrigerant by power obtained from a vehicle engine. A discharge capacity (displacement) of the compressor 10 is controlled so that a temperature or a pressure in the evaporator 30 becomes in a predetermined range. A radiator 20 is disposed to cool the refrigerant discharged from the compressor 10. Specifically, the radiator 20 is a high-pressure heat exchanger that performs heat-exchange between the refrigerant flowing from the compressor 10 and outside air.

An evaporator 30 is disposed to evaporate liquid refrigerant. Specifically, the evaporator 30 is a low-pressure heat exchanger that evaporates the liquid refrigerant by absorbing heat from air passing therethrough. Therefore, air passing through the evaporator 30 is cooled, and the cooled air can be blown into a compartment to cool the compartment.

An ejector 40 sucks refrigerant evaporated in the evaporator 30 while decompressing and expanding refrigerant flowing from the radiator 20, and increases pressure of refrigerant to be sucked into the compressor 10 by converting expansion energy to pressure energy.

A gas-liquid separator 50 separates the refrigerant from the ejector 40 into gas refrigerant and liquid refrigerant, and stores the separated refrigerant therein. The gas-liquid separator 50 includes a gas-refrigerant outlet connected to a suction port of the compressor 10, and a liquid-refrigerant outlet connected to an inlet side of the evaporator 30. A throttle 60 is disposed in a refrigerant passage between the liquid-refrigerant outlet of the gas-liquid separator 50 and the inlet side of the evaporator 30, so that liquid refrigerant supplied from the gas-liquid separator 50 to the evaporator 30 is decompressed.

Figure 3:
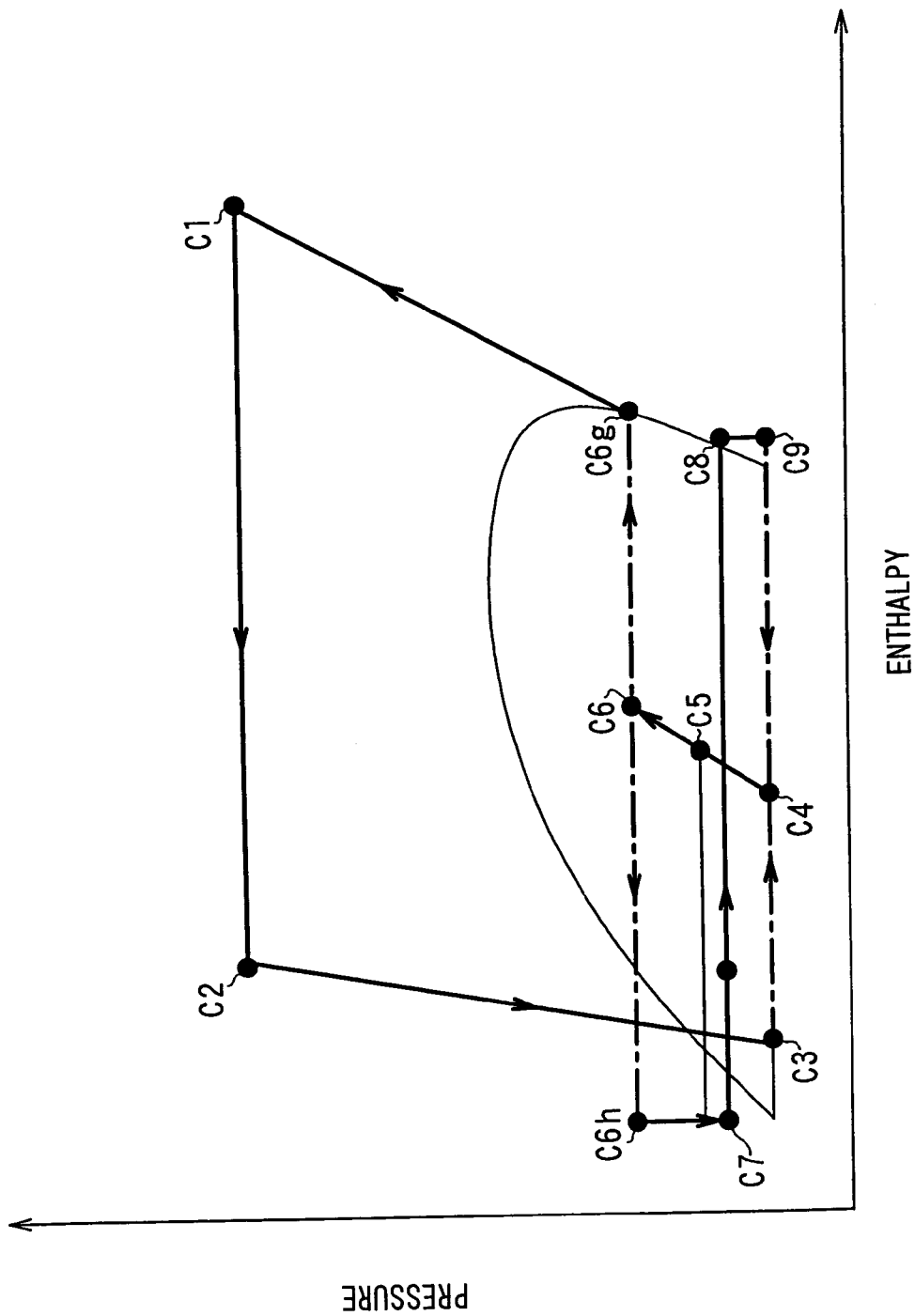
FIG. 3 is a Mollier diagram (p-h diagram) showing a relationship between a refrigerant pressure and an enthalpy in the ejector cycle.

In the ejector cycle, reference numbers C1–C9 shown in FIG. 3 indicate refrigerant states at positions indicated by reference numbers C1–C9 shown in FIG. 1, respectively, when carbon dioxide is used as the refrigerant.

Figures 2A, 2B:
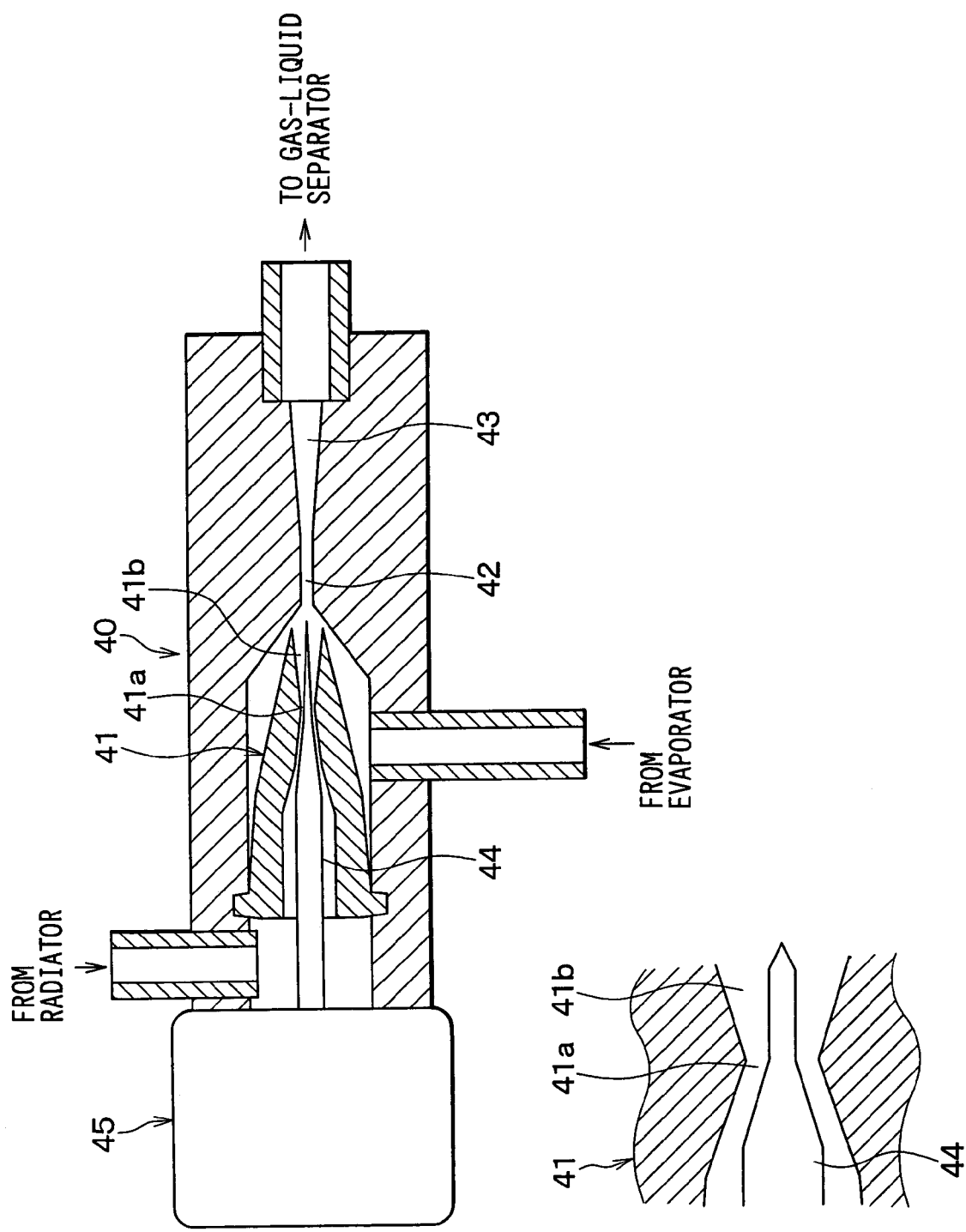
FIG. 2A is a schematic sectional view showing an ejector according to the embodiment.
FIG. 2B is a schematic enlarged view showing a part of a nozzle of the ejector in FIG. 2A.

Next, the structure of the ejector 40 will be now described in detail with reference to FIGS. 1, 2A and 2B. As shown in FIG. 2, the ejector 40 includes a nozzle 41, a mixing portion 42 and a diffuser 43. The nozzle 41 decompresses and expands high-pressure refrigerant from the radiator 20 in iso-entropy by converting pressure energy of the high-pressure refrigerant to speed energy. Gas refrigerant from the evaporator 30 is sucked into the mixing portion 42 by a high speed stream of refrigerant injected from the nozzle 41, and the sucked gas refrigerant and the injected refrigerant are mixed in the mixing portion 42. The diffuser 43 increases refrigerant pressure by converting the speed energy of refrigerant to the pressure energy of the refrigerant while mixing the gas refrigerant sucked from the evaporator 30 and the refrigerant injected from the nozzle 41.

In the mixing portion 42, the refrigerant jetted from the nozzle 41 and the refrigerant sucked from the evaporator 30 are mixed so that the sum of their momentum of two-kind refrigerant flows is conserved. Therefore, static pressure of refrigerant is increased also in the mixing portion 42. Because a sectional area of a refrigerant passage in the diffuser 43 is gradually increased, dynamic pressure of refrigerant is converted to static pressure of refrigerant in the diffuser 43. Thus, refrigerant pressure is increased in both of the mixing portion 42 and the diffuser 43. Accordingly, in the embodiment, a pressure-increasing portion is constructed with the mixing portion 42 and the diffuser 43. Theoretically, in the ejector 40, refrigerant pressure is increased in the mixing portion 42 so that the total momentum of two-kind refrigerant flows is conserved in the mixing portion 42, and the refrigerant pressure is further increased in the diffuser 43 so that total energy of refrigerant is conserved in the diffuser 43.

The nozzle 41 is a Laval nozzle having a throat portion 41a and an expansion portion 41b that is downstream from the throat portion 41a. Here, a cross-sectional area of the throat portion 41a is smallest in a refrigerant passage of the nozzle 41. As shown in FIG. 2A, an inner radial dimension of the expansion portion 41b is gradually increased from the throat portion 41a toward a downstream end (outlet) of the nozzle 41. A needle valve 44 is displaced by an actuator 45 in an axial direction of the nozzle 41, so that a throttle degree of the refrigerant passage of the nozzle 41 is adjusted. That is, the throttle degree of the refrigerant passage in the nozzle 41 is adjusted by the displacement of the needle valve 44. In this embodiment, an opening degree of the throat portion 41a and an opening degree of the outlet of the expansion portion 41b of the nozzle 41 are simultaneously or independently controlled by an adjustment unit such as the needle valve 44, so that the throttle degree of the refrigerant passage of the nozzle 41 is adjusted. The single needle valve 44 is disposed to extend at least from the throat portion 41a to the outlet of the expansion portion 41b, so that both the opening degree of the throat portion 41a and the opening degree of the outlet of the expansion portion 41b of the nozzle 41 are adjusted. By suitably adjusting both the opening degree of the throat portion 41a and the opening degree of the outlet of the nozzle 41, it can prevent a vertical shock wave from being generated between the throat portion 41a and the outlet of the nozzle 41. Therefore, nozzle efficiency can be improved regardless of a change of the flow amount of the refrigerant flowing into the nozzle 41.

In this embodiment, an electric actuator such as a linear solenoid motor and a stepping motor including a screw mechanism is used as the actuator 45. Further, the pressure of the high-pressure refrigerant is detected by a pressure sensor (not shown). Then, the open degree of the throat portion 41a and the opening degree of the outlet of the nozzle 41 are adjusted by the needle valve 41, so that the pressure detected by the pressure sensor becomes a target pressure that is determined based on a detected temperature of a temperature sensor. The temperature sensor is disposed at the high pressure side to detect the temperature of the high-pressure side refrigerant in the ejector cycle. The target pressure is set so that the coefficient of the ejector cycle becomes maximum, relative to the refrigerant temperature at the high-pressure side in the ejector cycle. As shown in FIG. 3, when the carbon dioxide is used as the refrigerant, the pressure of the high-pressure side refrigerant becomes higher than the critical pressure of the refrigerant. In this case, the opening area of the refrigerant passage of the nozzle 41 is controlled so that the pressure of the refrigerant flowing into the nozzle becomes equal to or higher than the critical pressure. On the other hand, when the pressure of the refrigerant flowing into the nozzle 41 is lower than the critical pressure of the refrigerant, the opening area of the refrigerant passage of the nozzle 41 is controlled so that refrigerant flowing into the nozzle 41 has a predetermined super-cooling degree.

In the ejector cycle, refrigerant is compressed in the compressor 10, and is discharged to the radiator 20. The refrigerant discharged from the compressor 10 is cooled in the radiator 20, and is decompressed in the nozzle 41 of the ejector 40 generally in iso-entropy. The flow speed of the refrigerant is increased in the nozzle 41 of the ejector 40 to be equal to or more than the sound speed at the outlet of the nozzle 41, and flows into the mixing portion 42 of the ejector 40. Further, gas refrigerant evaporated in the evaporator 30 is sucked into the mixing portion 42 of the ejector 40 by the pumping function due to the entrainment function of the high-speed refrigerant flowing from the nozzle 41 into the mixing portion 42. The refrigerant sucked from the evaporator 30 and the refrigerant injected from the nozzle 41 are mixed in the mixing portion 42, and flows into the gas-liquid separator 50 after the dynamic pressure of the refrigerant is converted to the static pressure of the refrigerant in the diffuser 43. Therefore, low-pressure side refrigerant circulates from the gas-liquid separator 50 to the gas-liquid separator 50 through the throttle 60, the evaporator 30 and the pressure-increasing portion of the ejector 40 in this order.

In an ideal nozzle 41, the refrigerant flowing into the nozzle 41 is throttled as toward the throat portion 41a from the inlet of the nozzle 41, and the flow speed of the refrigerant increases toward the throat portion 41a from the inlet of the nozzle 41. Then, at the throat portion 41a, the refrigerant becomes in the critical state, and the flow speed becomes Mach 1. Refrigerant after passing through the throat portion 41a is boiled and expanded in the expansion portion 41b, and the flow speed of the refrigerant becomes more than Mach 1 in the expansion portion 41b of the nozzle 41.

Figure 4:
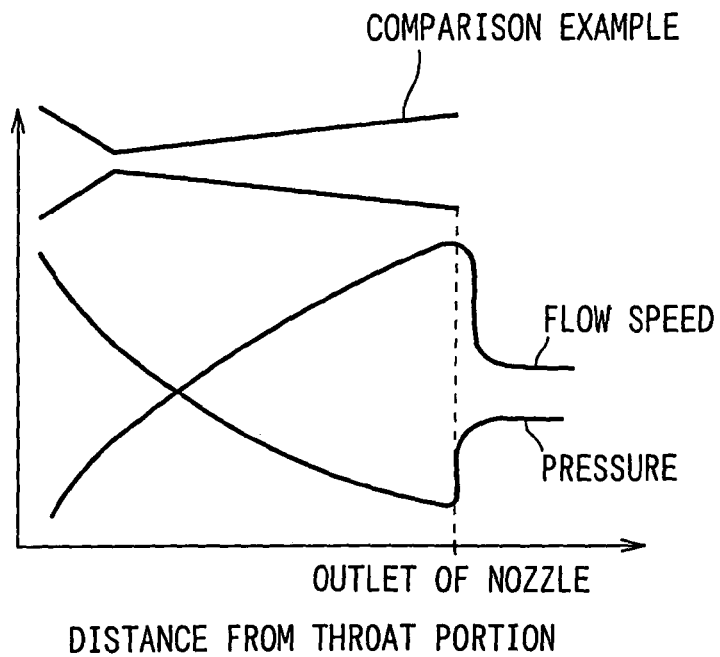
FIG. 4 is a view for explaining a problem in a comparison example.
Figure 5:
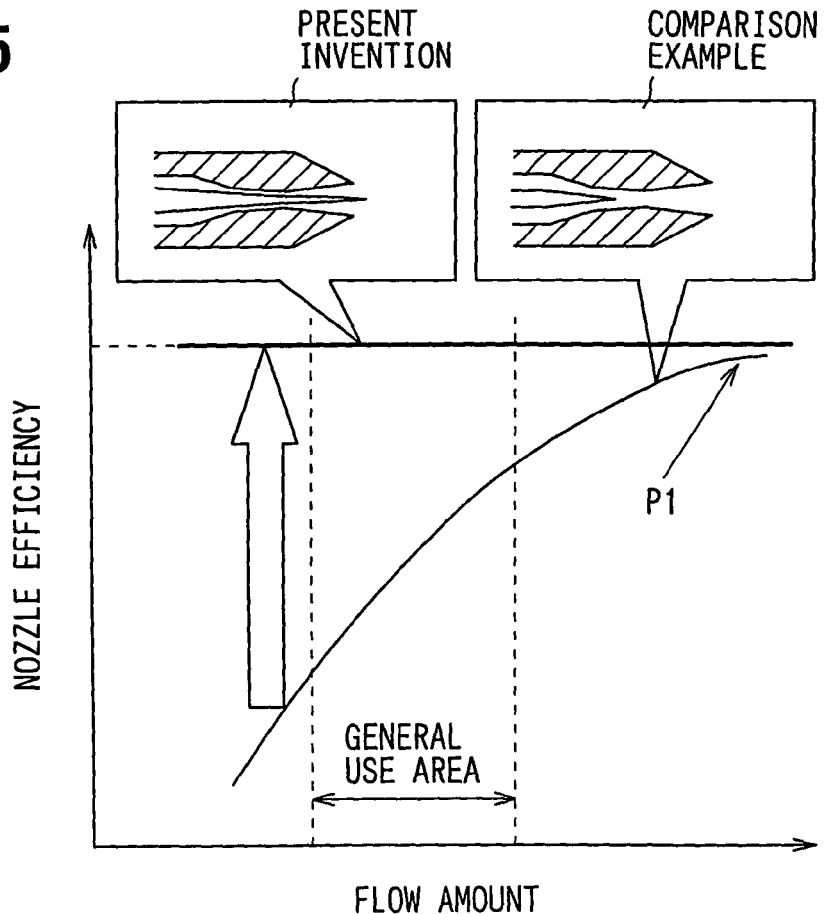
FIG. 5 is a graph showing nozzle efficiency in the present invention and in the comparison example.

However, in an actual refrigerant cycle, the refrigerant flow amount flowing into the nozzle 41 is changed in accordance with an air-conditioning load. Therefore, generally, the passage sectional areas of the throat portion 41a and the outlet of the expansion portion 41b of the nozzle 41 are set and formed based on the maximum flow amount in the maximum air-conditioning load, and the opening degree of the throat portion 41a is reduced when the refrigerant flow amount is reduced due to a reduced air-conditioning load. In a comparison example shown in FIG. 4 where only the opening degree of the throat portion 41 is controlled when the flow amount of the refrigerant is changed, because the opening degree of the outlet of the nozzle 41 is fixed, the refrigerant pressure in the expansion portion 41b around the outlet of the expansion portion 41b becomes lower than the refrigerant pressure outside the nozzle 41 around the outlet of the expansion portion 41b. Therefore, the vertical shock wave is readily generated, and the flow speed of the refrigerant at the outlet of the nozzle 41 becomes in the subsonic state, and the refrigerant is super-expanded at the outlet of the nozzle 41. Accordingly, in the comparison example, the refrigerant is not decompressed in iso-entropy in the nozzle 41, and the nozzle efficiency is greatly reduced as the flow amount of the refrigerant in the nozzle 41 is reduced, as shown in FIG. 5.

According to the present invention, the needle valve 44 is disposed in the refrigerant passage in the nozzle 41 to extend at least to the outlet (downstream end) of the nozzle 41. Therefore, by the movement of the needle valve 44 in the axial direction of the nozzle 41, both the opening degree of the throat portion 41a and the opening degree of the outlet of the nozzle 41 can be controlled. Accordingly, even when the flow amount of the refrigerant flowing into the nozzle 41 is changed in the general using area shown in FIG. 5, the nozzle efficiency can be maintained approximately in the maximum value by controlling both the opening degrees of the throat portion 41 and the outlet of the nozzle 41, as shown in FIG. 5. In FIG. 5, P1 shows a state where a cool-down operation is performed in the air conditioner in a high vehicle speed. That is, p1 shows a large cooling load state.

In the present invention, the opening degree of the throat portion 41a and the opening degree of the outlet of the nozzle 41 are adjusted by the needle valve 44 and the actuator 45, so that it can prevent the vertical shock wave from being generated in the nozzle 41. Therefore, it can prevent the refrigerant from being in a super-expansion state due to the subsonic flow at the outlet of the nozzle.

Although the present invention has been fully described in connection with the preferred embodiment thereof with reference to the accompanying drawings, it is to be noted that various changes and modifications will become apparent to those skilled in the art.

In the above-described embodiment, the present invention is typically applied to the vehicle air conditioner. However, the present invention can be applied to another ejector cycle such as a refrigerator, a freezer and a water heater. The actuator 45 may be a mechanical actuator using the pressure of inert gas or may be a non-electromagnetic electric actuator using piezoelectric elements. For example, the electric actuator is a stepping motor or a linear solenoid motor.

In the above-described embodiment, by using the single needle valve 44 operated by the actuator 45, both the opening degree of the throat portion 41a and the opening degree of the outlet of the nozzle 41 are simultaneously controlled. However, in the present invention, a valve for controlling the opening degree of the throat portion 41a and a valve for controlling the opening degree of the outlet of the nozzle 41 can be independently provided. Even in this case, by suitably controlling both the opening degrees of the throat portion 41a and the outlet of the nozzle 41, the decompression degree of the nozzle 41 is suitably adjusted, and the nozzle efficiency can be effectively improved.

Such changes and modifications are to be understood as being within the scope of the present invention as defined by the appended claims.

What is claimed is:

1. An ejector comprising:
   a nozzle for defining therein a passage through which a drive fluid flows, the nozzle including a throat portion having a cross-sectional area that is smallest in the passage of the nozzle;
   a pressure-increasing portion in which a fluid is sucked by entraiment of a jet flow of the drive fluid injected from the nozzle and is mixed with the drive fluid injected from the nozzle; and
   an adjustment unit that is disposed to adjust both an opening degree of the throat portion and an exit opening of an outlet of the nozzle; wherein
   the adjustment unit includes a needle valve that extends along a flow direction in the nozzle at least from the throat portion to the outlet of the nozzle in a manner that a distal end of the needle valve protrudes from the outlet of the nozzle, and an actuator for moving the needle valve in its axial direction to adjust the opening degrees of both the throat portion and the outlet of the nozzle; and
   the needle valve has a first conical portion placed radial inside the throat portion and a second conical portion placed radial inside the outlet of the nozzle, the first and second conical portions being formed in different shapes.

2. The ejector according to claim 1, wherein:
   the nozzle further includes an expansion portion downstream from the throat portion; and
   the needle valve at least extends to an outlet of the expansion portion.

3. The ejector according to claim 1, wherein the needle valve extends at least from an inlet of the nozzle to the outlet of the nozzle.

4. An ejector cycle comprising:
   a compressor for compressing and discharging a refrigerant;

a first heat exchanger disposed for cooling the refrigerant discharged from the compressor;

an ejector including a nozzle for decompressing and expanding the refrigerant flowing from the first heat exchanger;

a gas-liquid separator for separating refrigerant from the ejector into gas refrigerant and liquid refrigerant;

a second heat exchanger disposed for evaporating liquid refrigerant from the gas-liquid separator, wherein;

the nozzle has a throat portion having a cross-sectional area that is smallest in a refrigerant passage of the nozzle;

the ejector further includes a pressure-increasing portion in which the refrigerant from the evaporator is sucked by entraiment of a refrigerant flow injected from the nozzle and is mixed with the refrigerant injected from the nozzle, and an adjustment unit that is disposed to adjust both an opening degree of the throat portion and an exit opening of an outlet of the nozzle;

the adjustment unit includes a needle valve that extends along a flow direction in the nozzle at least from the throat portion to the outlet of the nozzle in a manner that a distal end of the needle valve protrudes from the outlet of the nozzle, and an actuator for moving the needle valve in its axial direction to adjust the opening degrees of both the throat portion and the outlet of the nozzle; and the needle valve has a first conical portion placed radial inside the throat portion and a second conical portion placed radial inside the outlet of the nozzle, the first and second conical portions being formed in different shapes.

* * * * *